(12) United States Patent
McColl et al.

(10) Patent No.: US 11,604,158 B2
(45) Date of Patent: Mar. 14, 2023

(54) CONTAMINATION DETERMINATION OF BIOSENSORS USED IN ANALYTE MEASUREMENT SYSTEMS

(71) Applicant: Lifescan IP Holdings, LLC, Malvern, PA (US)

(72) Inventors: David McColl, Inverness (GB); Allan MacRae, Inverness (GB); Gavin MacFie, Inverness (GB); Stephen Mackintosh, Inverness (GB); David Morris, Inverness (GB); Joanne Watt, Inverness (GB); Antony Smith, Dingwall (GB)

(73) Assignee: LifeScan IP Holdings, LLC, Malvern, PA (US)

( * ) Notice: Subject to any disclaimer, the term of this patent is extended or adjusted under 35 U.S.C. 154(b) by 13 days.

(21) Appl. No.: 15/964,107

(22) Filed: Apr. 27, 2018

(65) Prior Publication Data
US 2019/0331632 A1   Oct. 31, 2019

(51) Int. Cl.
*G01N 27/327*   (2006.01)
*G01N 27/416*   (2006.01)

(52) U.S. Cl.
CPC ..... *G01N 27/3274* (2013.01); *G01N 27/4163* (2013.01)

(58) Field of Classification Search
CPC .......................................... G01N 27/327–3274
See application file for complete search history.

(56) References Cited

U.S. PATENT DOCUMENTS 8,709,232 B2   4/2014   Matzinger
2015/0068922 A1*   3/2015   Mackintosh ........... C12Q 1/006
205/777.5

FOREIGN PATENT DOCUMENTS

WO     2012012341 A1   1/2012

* cited by examiner

*Primary Examiner* — J. Christopher Ball
(74) *Attorney, Agent, or Firm* — Barclay Damon LLP (57) ABSTRACT

A method for determining contamination of a biosensor in which the biosensor is loaded into a test meter and a sample is then applied. First and second predetermined test voltages are applied between spaced electrodes of the biosensor for respective first and second predetermined time intervals. First and second current values are measured during the respective first and second predetermined time intervals. Reference values are determined based on the measured first and second current values. Based on one or more of the reference values, a determination of contamination is made. Reporting of the analyte concentration of the sample can be suppressed based on the determination.

11 Claims, 9 Drawing Sheets

FIG. 6B understood.

CONTAMINATION DETERMINATION OF BIOSENSORS USED IN ANALYTE MEASUREMENT SYSTEMS

TECHNICAL FIELD

This application is generally directed to analyte measurement systems, and more specifically to methods for determining contamination, e.g., moisture contamination of a biosensor used in analyte measurement systems.

BACKGROUND

Analyte detection in physiological fluids, e.g., blood or blood derived products, is of ever increasing importance to today's society. Analyte detection assays find use in a variety of applications, including clinical laboratory testing, home testing, etc., where the results of such testing play a prominent role in periodic diagnosis and management in a variety of disease conditions. Analytes of interest include for diabetes management and cholesterol, among others. In response to the growing importance of analyte detection, a variety of testing protocols and devices for both clinical and home use have been developed.

One method that is employed for analyte detection of a liquid sample is the electrochemical method. In such a method, an aqueous liquid sample such as a blood sample is deposited onto a biosensor and filled into a sample-receiving chamber of an electrochemical cell that includes two electrodes, e.g., a counter and working electrode. The analyte is allowed to react with a redox reagent to form an oxidizable (or reducible) substance in an amount corresponding to the analyte concentration. The quantity of the oxidizable (or reducible) substance present is then estimated electrochemically and related to the amount of analyte present in the deposited sample.

For example, one of the blood measurement systems manufactured by LifeScan Inc., and marketed as One-Touch Verio ("Verio") has shown remarkably good overall performance and accuracy.

However, any analyte measurement system may be susceptible to various modes of inefficiency and/or error. For example, biosensors used in analyte measurement systems, such as disposable test strips, may become contaminated or damaged when stored by patients for self-administered blood tests, such as blood tests. Unfortunately, contaminated or damaged test strips may lead to erroneous, or higher than expected, analyte concentration measurements. These erroneous measurements can mislead a subject into administering the wrong dosage of medicine with potentially catastrophic results. Therefore, an urgent need exists to determine whether or not a critical amount of contamination or damage of a biosensor has in fact occurred before reporting an analyte measurement result.

BRIEF DESCRIPTION OF THE DRAWINGS

So that the manner in which the features of the disclosure can be understood, a Detailed Description may be had by reference to certain embodiments, some of which are illustrated in the accompanying drawings. It is to be noted, however, that the drawings illustrate only certain embodiments and are therefore not to be considered limiting of its scope, for the scope of the disclosed subject matter encompasses other embodiments as well. The drawings are not necessarily to scale, emphasis generally being placed upon illustrating the features of certain embodiments. In the drawings, like numerals are used to indicate like parts throughout the various views.

DETAILED DESCRIPTION

The following Detailed Description should be read with reference to the drawings, in which like elements in different drawings are identically numbered. The drawings, which are not necessarily to scale, depict selected embodiments and are not intended to limit the scope of the invention. The Detailed Description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. In addition, as used herein, the terms "patient," "host," "user," and "subject" refer to any human or animal subject and are not intended to limit the systems or methods to human use, although use of the subject techniques in a human patient represents a preferred embodiment.

The present disclosure relates, in part, to techniques for determining, with a biosensor such as a disposable test strip, whether the biosensor has been contaminated or damaged prior to the conduction of a test for determining analyte concentration of an applied sample. In addition to moisture contamination, these techniques may be applied to test strips that have been exposed to extreme temperatures (e.g., well above typical room temperatures), excessive light, higher levels of humidity, etc. Such contamination or exposure, which may result from improper storage, can lead to a certain amount of the mediator on a test strip electrode being converted, e.g., from potassium ferricyanide to potassium ferrocyanide. In one example, a moisture contaminated blood test strip may have an erroneously higher than expected result which is approximately 80 mg/dL (or greater) higher than the actual blood value. In such a case, this higher than expected measurement could lead to an incorrectly high dose of insulin being administered to a patient, resulting in a severe impact on the health of the patient.

Conversely, if a small amount of moisture contaminates a test strip, such that the test strip may still give results that are within an acceptable range of accuracy, the test result should be displayed to the patient. Thus, simple methods that only determine that some unknown level of moisture has contaminated a test strip do not solve the problem of only eliminating higher than expected results, and would reduce patient outcomes by increasing the cost of blood testing. In addition, a technique that requires a new test meter or additional physical test strips would be incompatible with previously deployed units, also increasing costs. Further, any testing of a test strip to determine contamination would only be effective if that testing did not itself damage or impede the use of the test strip to perform an analyte measurement.

While the Verio system discussed previously has very good overall performance, testing has shown, however, that biosensors are not completely impervious to contamination, such as contamination that may occur as a result of improper storage of the test strips. Such contamination may include moisture contamination or contamination by other external cause or stimulus (temperature, light, humidity). In attempts to find ways to reduce the impact of contamination, a technique is herein provided to alert users of test strips that will produce erroneous results due to contamination based on storage and environmental conditions. Consequently, various aspects of a method of determining if the biosensor has been contaminated are presented herein. In one example of the present technique, an analyte measurement may be made simultaneously along with a contamination determination, so that if the biosensor is not deemed contaminated or damaged, the test result can be released (displayed) to the patient. And, if the test strip is deemed to be contaminated, the test result can be suppressed so as to avoid giving a higher than expected analyte reading to the patient which could lead to improper medication dosing.

Generally stated and according to at least one embodiment, a method is provided for determining contamination of a biosensor. The biosensor is loaded into the test meter and a sample is applied to the biosensor. A first predetermined voltage is applied between the spaced electrodes of the electrochemical cell for a first predetermined time interval, and a second predetermined voltage between the spaced electrodes during a second predetermined time interval after the first predetermined time interval. First current values are measured during the first predetermined time interval. A first reference value is determined based on a sum of the first current values during the first predetermined time interval. Second current values are measured during the second predetermined time interval. A second reference value is determined based on a peak current value measured during the second predetermined time interval. A third reference value is determined based on the rate of change in current values measured after the peak current value during the second time interval. Whether the biosensor is contaminated is determined can be based on one or more of the first through the third reference values. Reporting of the concentration of the analyte is suppressed upon the determination that the biosensor is contaminated. In another embodiment, a test meter is presented that performs the steps of the method noted above.

The above embodiments are intended to be merely examples. It will be readily apparent from the following discussion that other embodiments are within the scope of the disclosed subject matter.

Specific working examples will now be described with respect to FIGS. 1-7.

Figure 1:
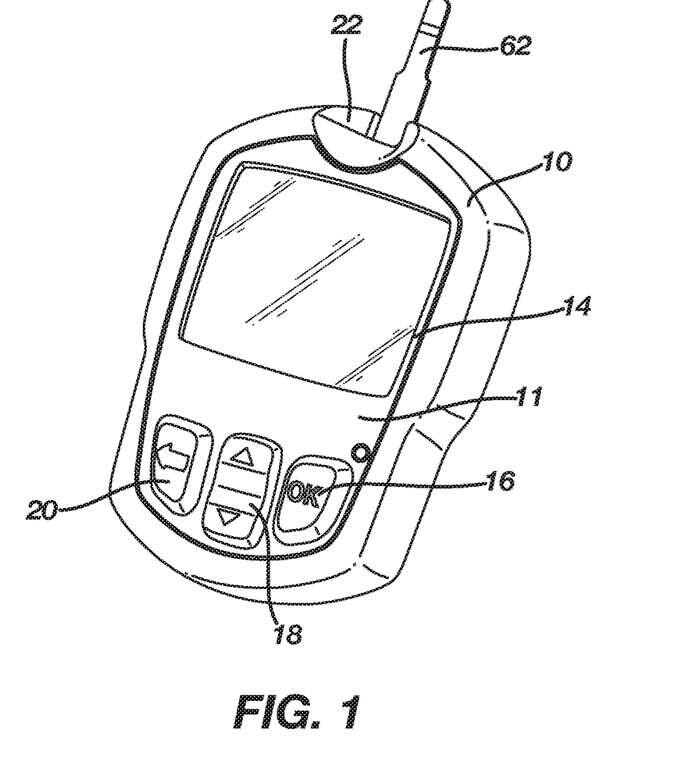
FIG. 1 illustrates a perspective view of an analyte measurement system including a test meter and biosensor (test strip), in accordance with aspects set forth herein.

FIG. 1 illustrates a diabetes management system that includes a portable test meter 10 and a biosensor, the latter being provided in the form of a disposable test strip 62 that is configured for the detection of blood glucose. For purposes of the following discussion, the portable test meter is synonymously referred to throughout as an analyte measurement and management unit, a meter, a meter, and/or a meter unit. Though not shown in this view and in at least one embodiment, the portable test meter may be combined with an insulin delivery device, an additional analyte testing device, and a drug delivery device. The portable test meter may be connected to a remote computer or remote server via a cable or a suitable wireless technology such as, for example, GSM, CDMA, Bluetooth, WiFi and the like. Such analyte measurement systems are described in U.S. Pat. No. 8,709,232 B2, issued Apr. 29, 2014, and entitled "Analyte Measurement Technique and System," and International Patent Publication No. WO 2012/012341 A1, published Jan. 26, 2012, and entitled "System and Method for Measuring an Analyte in a Sample," each of which is herein incorporated by reference in its entirety.

Still referring to FIG. 1, the portable test meter 10 is defined by a housing 11 having a plurality of user interface buttons (16, 18, and 20) that are disposed on a facing surface. A display 14 is provided in addition to a strip port opening 22 that is configured to receive a biosensor (test strip 62). The user interface buttons (16, 18, and 20) may be configured to allow the entry of data, navigation of menus, and execution of commands. It will be readily apparent that the configuration and functionality of the user interface buttons of the portable test meter 10 is intended to be an example and modifications and variations are possible. According to this specific embodiment, the user interface button 18 may be in the form of a two way toggle switch. Data may include values representative of analyte concentration, and/or information, which are related to the everyday lifestyle of an individual. Information, which is related to the everyday lifestyle, may include food intake, medication use, occurrence of health check-ups, and general health condition and exercise levels of an individual.

Figure 2:
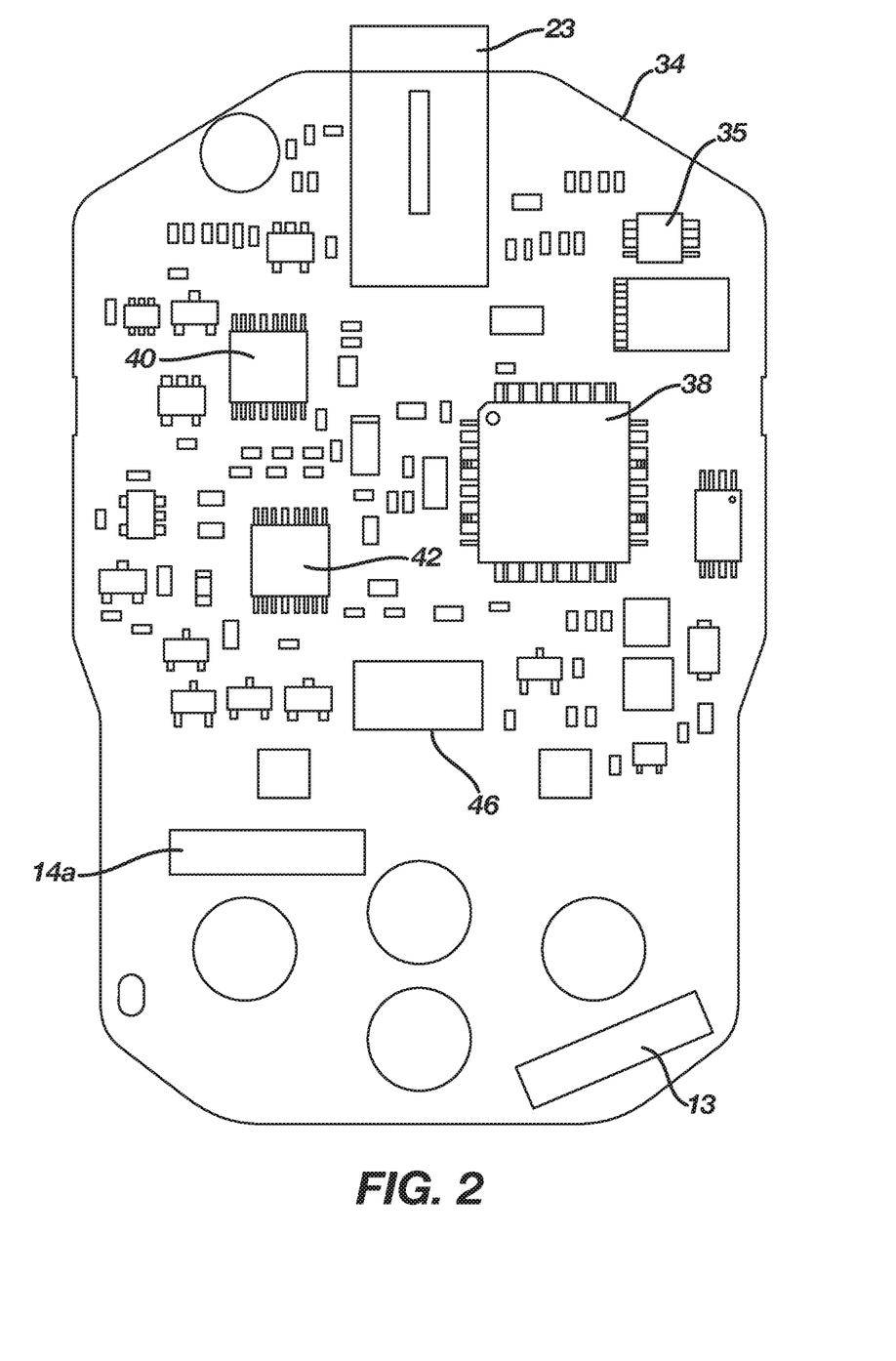
FIG. 2 is a top facing view of a circuit board disposed in the test meter of FIG. 1, depicting various components in accordance with aspects set forth herein.

As represented in FIG. 2 and shown in simplified schematic form, the electronic components of the portable test meter 10 may be disposed on a circuit board 34 contained within the interior of the housing 11, FIG. 1. According to this embodiment, the electronic components include a strip port connector 23, an operational amplifier circuit 35, a microcontroller 38, a display connector 14a, a non-volatile memory 40, a clock 42, and a first wireless module 46. On an opposing bottom surface of the circuit board 34, the electronic components may include a battery connector (not shown) and a data port 13. It will be understood that the relative position of the various electronic components can be varied and the configuration herein described is exemplary.

The microcontroller 38 may be electrically connected to the strip port connector 23 aligned with the strip port opening 22 (FIG. 1), the operational amplifier circuit 35, the first wireless module 46, the display 14, the non-volatile memory 40, the clock 42, at least one battery (not shown), a data port 13, and the user interface buttons (16, 18, and 20).

The operational amplifier circuit 35 may include two or more operational amplifiers configured to provide a portion of the potentiostat function and the current measurement function. The potentiostat function may refer to the application of a test voltage between at least two electrodes of a test strip. The current function may refer to the measurement of a test current resulting from the applied test voltage. The current measurement may be performed with a current-to-voltage converter. The microcontroller 38 may be in the form of a mixed signal microprocessor (MSP) 430 such as, for example, the Texas Instruments (TI) MSP. The MSP 430 may be configured to also perform a portion of the potentiostat function and the current measurement function. In addition, the 430 may also include volatile and non-volatile memory. In another embodiment, many of the electronic components may be integrated with the microcontroller in the form of an application specific integrated circuit (ASIC).

The strip port connector 23 may be configured to form an electrical connection to the test strip 62. The display connector 14a may be configured to attach to the display 14. For purposes of this description, the display 14 may be in the form of a liquid crystal display for reporting measured levels, and for facilitating entry of lifestyle related information. The display 14 may optionally include a backlight. The data port 13 may accept a suitable connector attached to a connecting lead, thereby allowing the test meter 10 to be linked to an external device, such as a personal computer (not shown). For purposes of this description, the data port 13 may be any port that allows for transmission of data such as, for example, a serial, USB, or a parallel port. The data port 13 can be accessed through the housing 11 of the portable test meter 10. The clock 42 may be configured to keep current time related to the geographic region in which the user is located and also for measuring time. The test meter may be configured to be electrically connected to a power supply such as, for example, at least one contained battery (not shown).

Figures 3A, 3B:
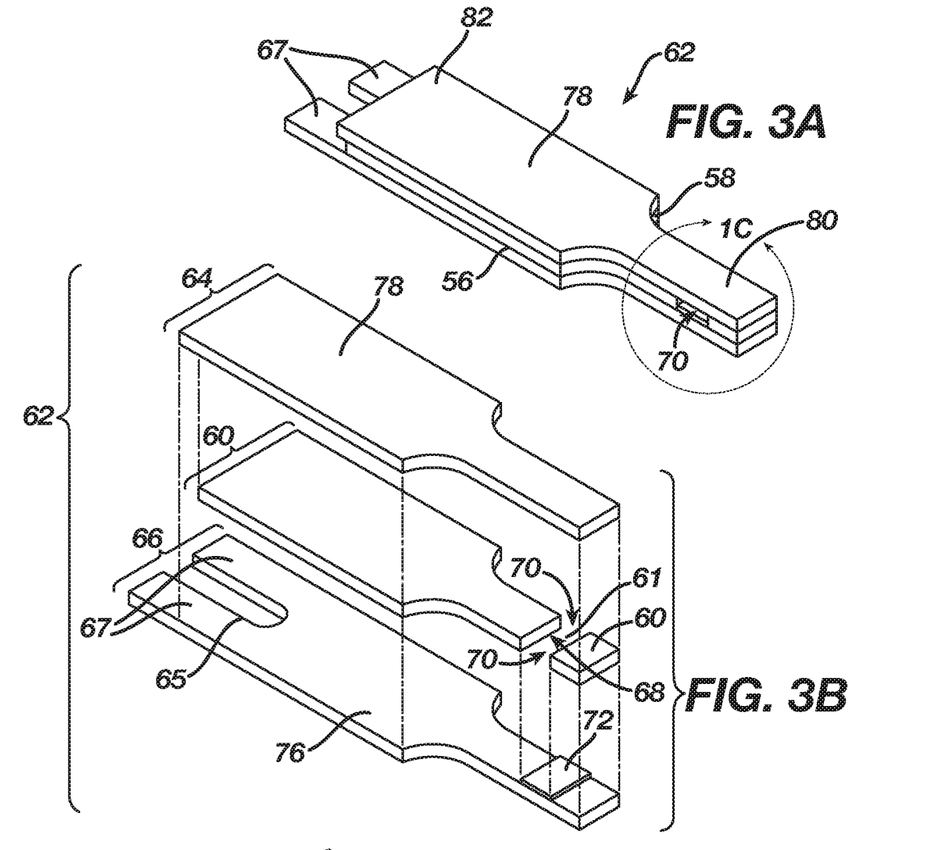
FIG. 3A is a perspective view of an assembled test strip suitable for use in the analyte measurement system of FIGS. 1 and 2.
FIG. 3B is an exploded perspective view of the test strip of FIG. 3A.
Figure 3C:
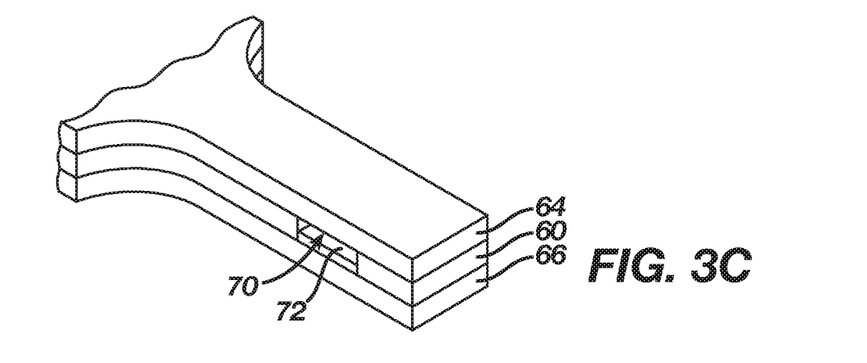
FIG. 3C is an expanded perspective view of a proximal portion of the test strip of FIGS. 3A and 3B.
Figure 3D:
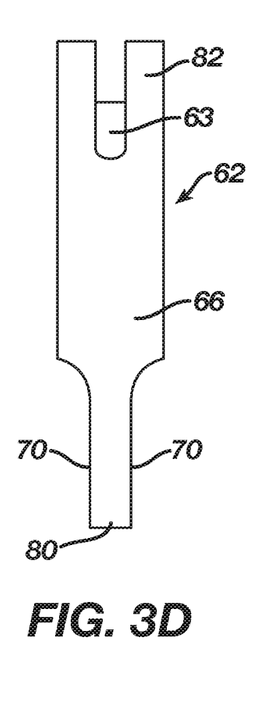
FIG. 3D is a bottom plan view of the test strip of FIGS. 3A-3C.
Figure 3E:
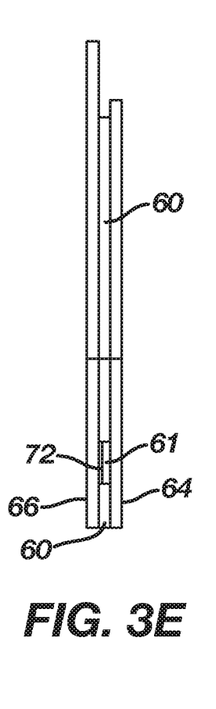
FIG. 3E is a side elevational view of the test strip of FIGS. 3A-3D.
Figure 3F:
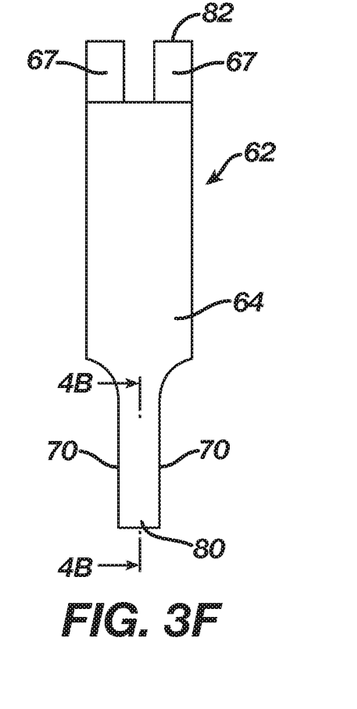
FIG. 3F is a top plan view of the test strip of FIGS. 3A-3E.

FIGS. 3A-3G show various views of a test strip 62 suitable for use with the methods and systems described herein. In an exemplary embodiment, the test strip 62 is defined by an elongate body extending from a distal end 80 to an opposing proximal end 82, and having lateral edges 56, 58, as illustrated in FIG. 3A. As shown in FIG. 3B, the test strip 62 also includes a first electrode layer 66, a second electrode layer 64, and a spacer 60 sandwiched in between the two electrode layers 64 and 66 at the distal end 80 of the test strip 62. The first electrode layer 66 may include a first electrode 66, a first connection track 76, and a first contact pad 67, where the first connection track 76 electrically connects the first electrode 66 to the first contact pad 67, as shown in FIGS. 3B and 3C. Note that the first electrode 66 is a portion of the first electrode layer 66 that is immediately beneath the reagent layer 72, as indicated by FIGS. 3A and 3B. Similarly, the second electrode layer 64 may include a second electrode 64, a second connection track 78, and a second contact pad 63, where the second connection track 78 electrically connects the second electrode 64 with the second contact pad 63, as shown in FIGS. 3A-3C. Note that the second electrode 64 is a portion of the second electrode layer 64 that is disposed above the reagent layer 72, as best shown in FIGS. 3B and 3C.

Figure 3G:
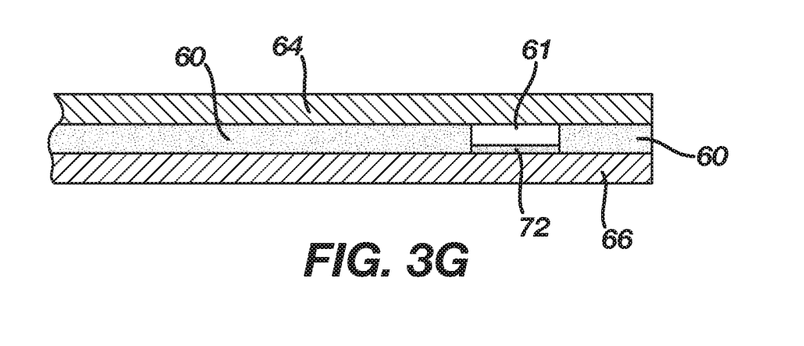
FIG. 3G is a partial side elevational view of a proximal portion of the test strip of FIGS. 3A-3F.

As shown, a sample-receiving chamber 61 (e.g., an electrochemical cell) is defined by the first electrode 66, the second electrode 64, and the spacer 60 proximate to the distal end 80 of the test strip 62, as shown in FIGS. 3B-3E. The first electrode 66 and the second electrode 64 may define the bottom and the top of sample-receiving chamber 61, respectively, as illustrated in FIG. 3G. A cutout area 68 of the spacer 60 may define the sidewalls of the sample-receiving chamber 61, as illustrated in FIG. 3G. In one aspect, the sample-receiving chamber 61 may include ports 70 that provide a sample inlet and/or a vent, as shown in FIGS. 3A-3C. For example, one of the ports 70 may allow a fluid sample to ingress and the other port 70 may allow air to egress.

In an exemplary embodiment, the sample-receiving chamber 61 may have a small volume. For example, the chamber 61 may have a volume in the range of from about 0.1 microliters to about 5 microliters, about 0.2 microliters to about 3 microliters, or, preferably, about 0.3 microliters to about 1 microliter. To provide the small sample volume, the cutout 68 may have an area ranging from about 0.01 $cm^2$ to about 0.2 $cm^2$, about 0.02 $cm^2$ to about 0.15 $cm^2$, or, preferably, about 0.03 $cm^2$ to about 0.08 $cm^2$. In addition, first electrode 66 and second electrode 64 may be spaced apart in the range of about 1 micron to about 500 microns, preferably between about 10 microns and about 400 microns, and more preferably between about 40 microns and about 200 microns. The relatively close spacing of the electrodes may also allow redox cycling to occur, where oxidized mediator generated at the first electrode 66, may diffuse to the second electrode 64 to become reduced, and subsequently diffuse back to the first electrode 66 to become oxidized again. Those skilled in the art will appreciate that various such volumes, areas, and/or spacing of electrodes is within the spirit and scope of the present disclosure.

In one embodiment, the first electrode 66 and the second electrode 64 may each include an electrode layer. The electrode layer may include a conductive material formed from materials such as gold, palladium, carbon, silver, platinum, tin oxide, iridium, indium, or combinations thereof (e.g., indium doped tin oxide). In addition, the electrode layers may be formed by disposing a conductive material onto an insulating sheet (not shown) by a sputtering, electroless plating, or a screen-printing process. In one exemplary embodiment, the first electrode 66 and the second electrode 64 may each include electrode layers made from sputtered palladium and sputtered gold, respectively. Suitable materials that may be employed as spacer 60 include a variety of insulating materials, such as, for example, plastics (e.g., PET, PETG, polyimide, polycarbonate, polystyrene), silicon, ceramic, glass, adhesives, and combinations thereof.

In one embodiment, the spacer 60 may be in the form of a double sided adhesive coated on opposing sides of a polyester sheet where the adhesive may be pressure sensitive or heat activated. Applicants note that various other materials for the first electrode layer 66, the second electrode layer 64, and/or the spacer 60 are within the spirit and scope of the present disclosure.

Either the first electrode 66 or the second electrode 64 may perform the function of a working electrode depending on the magnitude and/or polarity of at least one applied test voltage. The working electrode may measure a limiting test current that is proportional to the reduced mediator concentration. For example, if the current limiting species is a reduced mediator (e.g., potassium ferrocyanide), then it may be oxidized at the first electrode 66 as long as the test voltage is sufficiently greater than the redox mediator potential with respect to the second electrode 64. In this situation, the first electrode 66 performs the function of the working electrode and the second electrode 64 performs the function of a counter/reference electrode. Applicants note that one may refer to a counter/reference electrode simply as a reference electrode or a counter electrode. A limiting oxidation occurs when all of the reduced mediator has been depleted at the working electrode surface such that the measured oxidation current is proportional to the flux of reduced mediator diffusing from the bulk solution towards the working electrode surface. The term "bulk solution" as used herein refers to a portion of the solution sufficiently far away from the working electrode where the reduced mediator is not located within a depletion zone. It should be noted that unless otherwise stated for the test strip 62, all potentials applied by the test meter 10 will hereinafter be stated with respect to the second electrode 64.

Similarly, if the test voltage is sufficiently less than the redox mediator potential, then the reduced mediator may be oxidized at the second electrode 64 as a limiting current. In such a situation, the second electrode 64 performs the function of the working electrode and the first electrode 66 performs the function of the counter/reference electrode.

Initially, an analysis may include introducing a quantity of a fluid sample into the sample-receiving chamber 61 via one of the ports 70. In one aspect, the port 70 and/or the sample-receiving chamber 61 may be configured such that capillary action causes the fluid sample to fill the sample-receiving chamber 61. The first electrode 66 and/or second electrode 64 may be coated with a hydrophilic reagent to promote the capillarity of the sample-receiving chamber 61. For example, thiol derivatized reagents having a hydrophilic moiety, such as 2-mercaptoethane sulfonic acid, may be coated onto the first electrode and/or the second electrode.

In the analysis of the test strip 62 above, the reagent layer 72 can include dehydrogenase (GDH) based on the PQQ co-factor and ferricyanide. In another embodiment, the enzyme GDH based on the PQQ co-factor may be replaced with the enzyme GDH based on the FAD co-factor. When blood or control solution is dosed into a sample reaction chamber 61, is oxidized by $GDH_{(ox)}$ and in the process, converts $GDH_{(ox)}$ to $GDH_{(red)}$, as shown in the chemical transformation T.1 below. Note that $GDH_{(ox)}$ refers to the oxidized state of GDH, and $GDH_{(red)}$ refers to the reduced state of GDH.

D-Glucose+$GDH_{(ox)}$→Gluconic acid+$GDH_{(red)}$     T.1

Next, $GDH_{(red)}$ is regenerated back to its active oxidized state by ferricyanide (i.e. oxidized mediator or $Fe(CN)_6^{3-}$, such as potassium ferricyanide) as shown in chemical transformation T.2 below. In the process of regenerating $GDH_{(ox)}$, ferrocyanide (i.e. reduced mediator or $Fe(CN)_6^{4-}$, such as potassium ferrocyanide) is generated from the reaction as shown in T.2:

$GDH_{(red)}+2Fe(CN)_6^{3-} \rightarrow GDH_{(ox)}+2Fe(CN)_6^{4-}$     T.2

Figure 4:
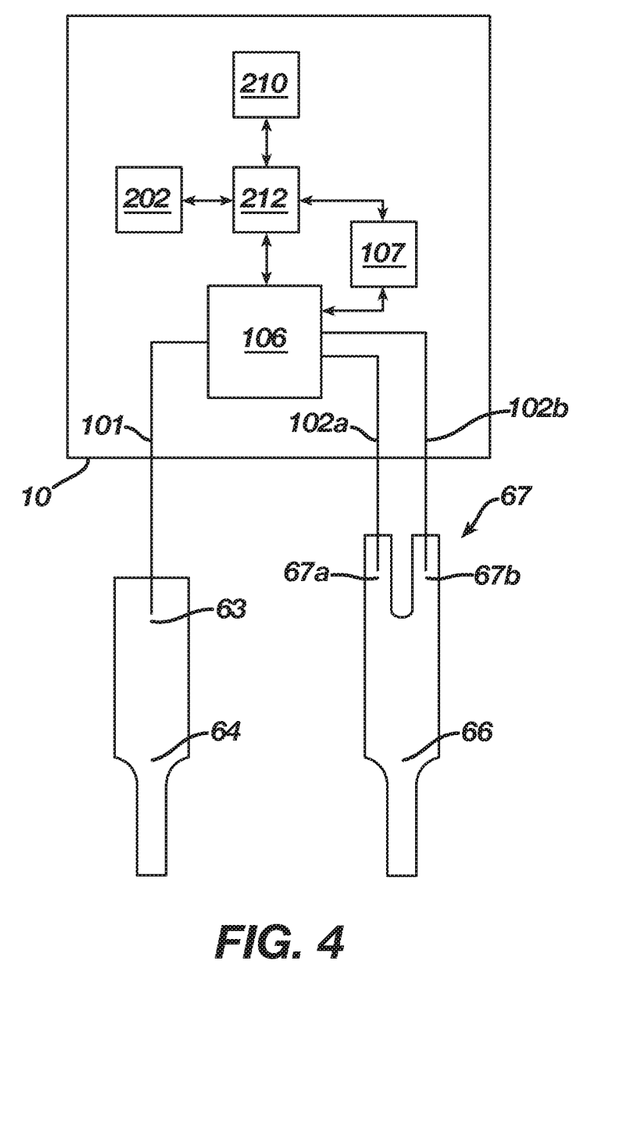
FIG. 4 is a simplified schematic diagram showing a test meter electrically interfacing with portions of a test strip, such as the test strip depicted in FIGS. 3A-3F.

FIG. 4 provides a simplified schematic showing a test meter 10 interfacing with a first contact pad 67a, 67b and a second contact pad 63 of the test strip 62. The second contact pad 63 may be used to establish an electrical connection to the test meter 10 through a U-shaped notch 65, as illustrated in FIG. 3B. In one embodiment, the test meter 10 may include a second electrode connector 101, first electrode connectors (102a, 102b), a test voltage unit 106, a current measurement unit 107, a processor 212, a memory unit 210, and a visual display 202, as schematically shown in FIG. 4. The first contact pad 67 may include two prongs denoted as 67a and 67b. In one exemplary embodiment, the first electrode connectors 102a and 102b separately connect to prongs 67a and 67b, respectively. The second electrode connector 101 may connect to the second contact pad 63. The test meter 10 may measure the resistance or electrical continuity between the prongs 67a and 67b to determine whether the test strip 62 is electrically connected to the test meter 10.

In one embodiment, the test meter 10 may apply a test voltage and/or a current between the first contact pad 67 and the second contact pad 63. Once the test meter 10 recognizes that the strip 62 has been inserted, the test meter 10 is powered on and initiates a fluid detection mode. In one embodiment, the fluid detection mode causes the test meter 10 to apply a constant current of about 1 microampere between the first electrode 66 and the second electrode 64. Because the test strip 62 is initially dry, the test meter 10 measures a relatively large voltage. When the fluid sample bridges the gap between the first electrode 66 and the second electrode 64 during the dosing process, the test meter 10 will measure a decrease in measured voltage that is below a predetermined threshold causing the test meter 10 to automatically initiate a glucose test.

Figure 5A:
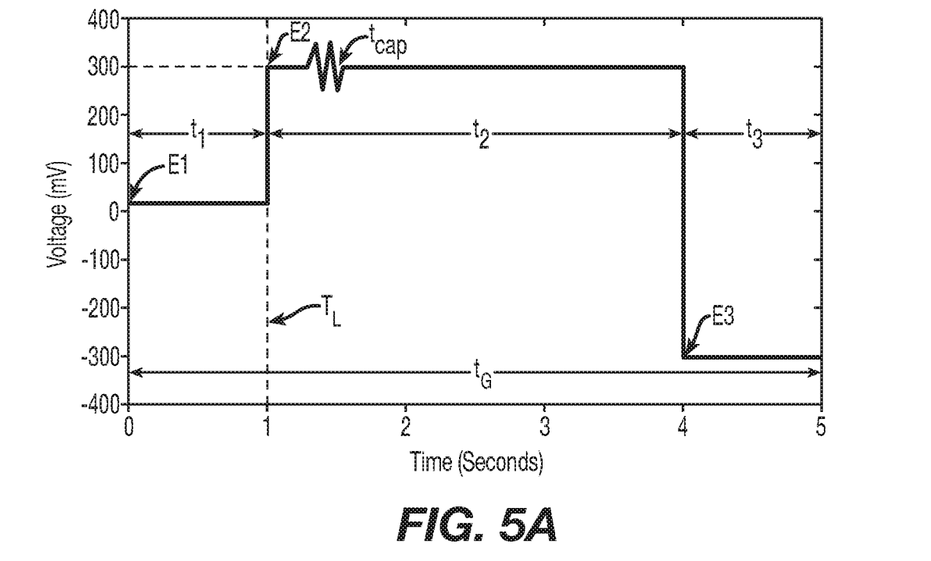
FIG. 5A shows an example of a test waveform applied by the test meter of FIG. 4 to the working and counter electrodes of a test strip for prescribed time intervals for the determination of an analyte in a sample applied to the test strip.
Figure 5B:
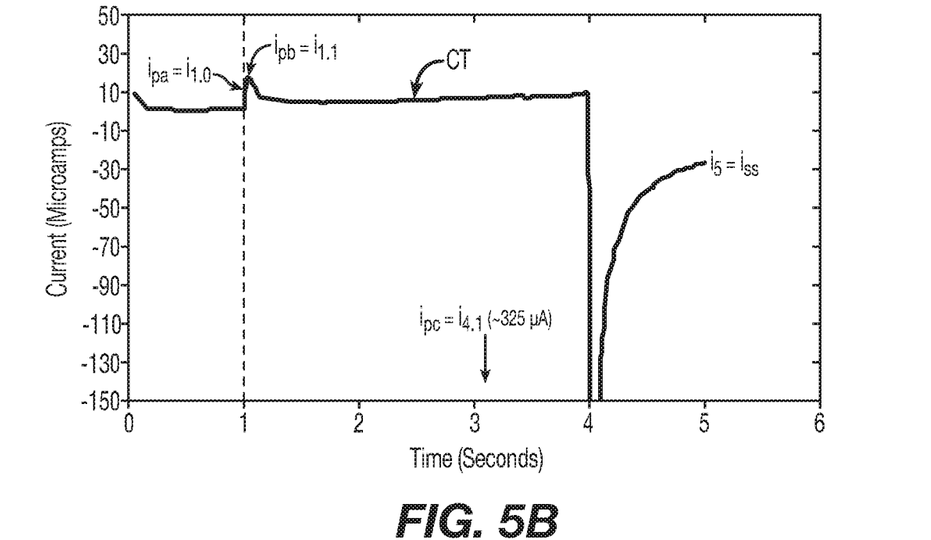
FIG. 5B depicts measured current over time based on the waveform of FIG. 5A for a nominal test strip.
Figure 5C:
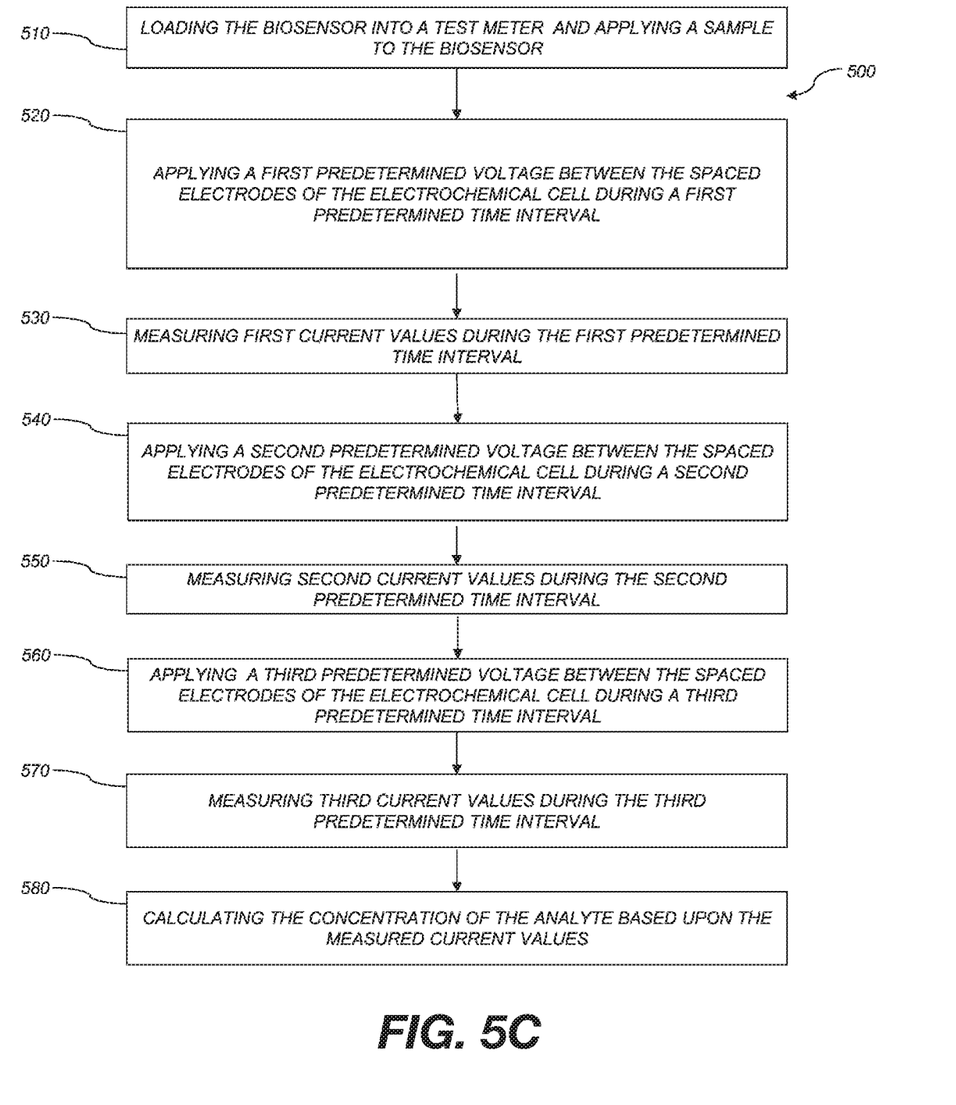
FIG. 5C is a flowchart representing a method for determining analyte concentration in a test strip.

Referring to FIGS. 5A-5C, a method for determining an analyte concentration, using a test strip 62 and the test meter 10, will now be described. By way of overview, first, application of the test voltages and measurement of current values will be discussed, followed by an explanation of analyte concentration measurement.

First, with respect to the application of voltages to the test strip, example meter 10 and example test strip 62 are references. The test meter 10 may include electronic circuitry that can be used to apply a plurality of voltages to the test strip 62 and to measure a current transient output resulting from an electrochemical reaction in a test chamber of the test strip 62. The test meter 10 also may include a signal processor with a set of instructions for the method of determining an analyte concentration in a fluid sample as disclosed herein. In one embodiment, the analyte is blood glucose.

Continuing with the discussion of application of test voltages, FIG. 5A sets forth an exemplary waveform consisting of a plurality of test voltages applied to the test strip 62 for prescribed time intervals. The plurality of test voltages according to this waveform include a first test voltage E1 that is applied for a first time interval $t_1$, a second test voltage E2 that is applied for a second time interval $t_2$, and a third test voltage E3 applied for a third time interval $t_3$. The third voltage E3 may be different in the magnitude of the electromotive force, in polarity, or combinations of both with respect to the second test voltage E2. In the preferred embodiments and as shown, E3 may be of the same magnitude as E2 but opposite in polarity. A glucose test time interval $t_G$ represents an amount of time to perform the glucose test (but not necessarily all the calculations associated with the glucose test). Glucose test time interval $t_G$ may range from about 1.1 seconds to about 5 seconds. Further, as illustrated in FIG. 5A, the second test voltage E2 may include a constant (DC) test voltage component and a superimposed alternating (AC), or alternatively oscillating, test voltage component applied for a short time interval. More specifically, the superimposed alternating or oscillating test voltage component may be applied for a time interval indicated by $t_{cap}$ at the initiation of the second time interval.

The plurality of test current values measured during any of the time intervals may be performed at a frequency ranging from about 1 measurement per microsecond to about one measurement per 100 milliseconds and preferably at about 50 milliseconds. While an embodiment using three test voltages in a serial manner is described, the glucose test may include different numbers of open-circuit and test voltages. For example, as an alternative embodiment, the glucose test could include an open-circuit for a first time interval, a second test voltage for a second time interval, and a third test voltage for a third time interval. It should be noted that the reference to "first," "second," and "third" are chosen for convenience and do not necessarily reflect the order in which the test voltages are applied. For instance, an embodiment may have a potential waveform where the third test voltage may be applied before the application of the first and second test voltage.

FIG. 5C is a flowchart representing a method 500 for determining analyte concentration in a nominal or uncontaminated test strip, based on the waveform of FIG. 5A and measured currents as shown in FIG. 5B. In exemplary step 510, the glucose assay is initiated by inserting a test strip 62 into the test meter 10 and by depositing a sample on the test strip 62. In exemplary step 520, the test meter 10 may apply a first test voltage E1 (e.g., approximately 20 mV in FIG. 5A) between the first electrode 66 and the second electrode 64 for a first time interval $t_1$ (e.g., 1 second in FIG. 5A). The first time interval $t_1$ may range from about 0.1 seconds to about 3 seconds and preferably range from about 0.2 seconds to about 2 seconds, and most preferably range from about 0.3 seconds to about 1.1 seconds.

The first time interval $t_1$ may be sufficiently long so that the sample-receiving chamber 61 may fully fill with sample and also so that the reagent layer 72 may at least partially dissolve or solvate. In one aspect, the first test voltage E1 may be a value relatively close to the redox potential of the mediator so that a relatively small amount of a reduction or oxidation current is measured. FIG. 5B shows that a relatively small amount of current is observed during the first time interval $t_1$ compared to the second and third time intervals $t_2$ and $t_3$. For example, when using potassium ferricyanide and/or potassium ferrocyanide as the mediator, the first test voltage E1 in FIG. 5A may range from about 1 mV to about 100 mV, preferably range from about 5 mV to about 50 mV, and most preferably range from about 10 mV to about 30 mV. Although the applied voltages are given as positive values in the preferred embodiments, the same voltages in the negative domain could also be utilized to accomplish the intended purpose of the claimed invention. During this interval, the first current output may be sampled by the processor to collect current values over this interval in step 530.

In exemplary step 540, after applying the first test voltage E1 (step 520) and sampling the output (step 530), the test meter 10 applies a second test voltage E2 between first electrode 66 and second electrode 64 (e.g., approximately 300 millivolts in FIG. 5A), for a second time interval $t_2$ (e.g., about 3 seconds in FIG. 5A). The second test voltage E2 may be a value different than the first test voltage E1 and may be sufficiently negative of the mediator redox potential so that a limiting oxidation current is measured at the second electrode 64. For example, when using potassium ferricyanide and/or potassium ferrocyanide as the mediator, the second test voltage E2 may range from about zero mV to about 600 mV, preferably range from about 100 mV to about 600 mV, and more preferably is about 300 mV.

The second time interval $t_2$ should be sufficiently long so that the rate of generation of reduced mediator (e.g., potassium ferrocyanide) may be monitored based on the magnitude of a limiting oxidation current. Reduced mediator is generated by enzymatic reactions with the reagent layer 72. During the second time interval $t_2$, a limiting amount of reduced mediator is oxidized at second electrode 64 and a non-limiting amount of oxidized mediator is reduced at first electrode 66 to form a concentration gradient between the first electrode 66 and the second electrode 64.

In an exemplary embodiment, the second time interval $t_2$ should also be sufficiently long so that a sufficient amount of potassium ferricyanide may be diffused to the second electrode 64 or diffused from the reagent on the first electrode. A sufficient amount of potassium ferricyanide is required at the second electrode 64 so that a limiting current may be measured for oxidizing potassium ferrocyanide at the first electrode 66 during the third test voltage E3. The second time interval $t_2$ may be less than about 60 seconds, and preferably may range from about 1.1 seconds to about 10 seconds, and more preferably range from about 2 seconds to about 5 seconds. Likewise, the time interval indicated as $t_{cap}$ in FIG. 5A may also last over a range of times, but in one exemplary embodiment it has a duration of about 20 milliseconds. In one exemplary embodiment, the superimposed alternating test voltage component is applied after about 0.3 seconds to about 0.4 seconds after the application of the second test voltage E2, and induces a sine wave having a frequency of about 109 Hz with an amplitude of about +/−50 mV. During this interval, a second current output may be sampled by the processor to collect current values over this interval in step 550.

FIG. 5B shows a relatively small peak $i_{pb}$ after the beginning of the second time interval $t_2$ followed by a gradual increase of an absolute value of an oxidation current during the second time interval $t_2$. The small peak $i_{pb}$ occurs due oxidation of endogenous or exogenous reducing agents after a transition from first voltage E1 to second voltage E2 leading to a gradual increase of an absolute value of an oxidation current during the second time interval $t_2$. The small peak $i_{pb}$ occurs due to an initial depletion of reduced mediator after a transition from the first voltage E1 to the second voltage E2, referenced here as transition line TL. Thereafter, there is a gradual absolute decrease in oxidation current after the small peak $i_p b$ is caused by the generation of potassium ferrocyanide by reagent layer 72, which then diffuses to the second electrode 64.

In exemplary step 560, after applying the second test voltage E2 (step 540) and sampling the output (step 550), the test meter 10 applies a third test voltage E3 between the first electrode 66 and the second electrode 64 (e.g., about −300 millivolts in FIG. 5A) for a third time interval $t_3$ (e.g., 1 second in FIG. 5A). The third test voltage E3 may be a value sufficiently positive of the mediator redox potential so that a limiting oxidation current is measured at the first electrode 66. For example, when using potassium ferricyanide and/or potassium ferrocyanide as the mediator, the third test voltage E3 may range from about zero mV to about −600 mV, preferably range from about −100 mV to about −600 mV, and more preferably is about −300 mV.

After applying the third test voltage E3, in step 570 current values are measured in the third time interval $t_3$. The third time interval $t_3$ may be sufficiently long to monitor the diffusion of reduced mediator (e.g., potassium ferrocyanide) near the first electrode 66 based on the magnitude of the oxidation current. During the third time interval t₃, a limiting amount of reduced mediator is oxidized at the first electrode 66 and a non-limiting amount of oxidized mediator is reduced at the second electrode 64. The third time interval $t_3$ may range from about 0.1 seconds to about 5 seconds and preferably range from about 0.3 seconds to about 3 seconds, and more preferably range from about 0.5 seconds to about 2 seconds.

FIG. 5B shows a relatively large peak $i_{pc}$ at the beginning of the third time interval $t_3$ followed by a decrease to a steady-state current $i_{ss}$ value, for a nominal test strip. In one embodiment, the second test voltage E2 may have a first polarity and the third test voltage E3 may have a second polarity that is opposite to the first polarity. In another embodiment, the second test voltage E2 may be sufficiently negative of the mediator redox potential and the third test voltage E3 may be sufficiently positive of the mediator redox potential. The third test voltage E3 may be applied immediately after the second test voltage E2. However, one skilled in the art will appreciate that the magnitude and polarity of the second and third test voltages may be chosen depending on the manner in which analyte concentration is determined.

Next, glucose concentration determination is described for the embodiments described herein, and as set forth in step 580 of FIG. 5C. FIGS. 5A and 5B show the sequence of events in the test strip transient. At approximately 1.1 seconds after initiation of the test sequence (and shortly after making the second electrode the working electrode due to application of the second voltage E2), when no reagent has yet reached the first electrode, and current is due presumably to only interfering reducing agents in plasma (in the absence of mediator), a current measurement is taken to later correct for interferences. Between about 1.4 seconds and about 4 seconds, when (at least in the latter part of this interval when a second voltage E2 is applied) mediator and oxidized mediator have been able to diffuse to the second electrode, a first glucose-proportional current, $i_l$, is measured. Shortly after making the first electrode the working electrode via application of the third voltage E3, 2 single-point measurements (at approximately 4.1 and 5 seconds according to this embodiment) and one integrated measurement $i_r$ are taken. The measurements sampled respectively at 1.1, 4.1 and 5 seconds according to this specific embodiment are used to correct $i_r$ for additive current from interfering reducing agents (i2corr). The ratio of $i_l$ to $i_r$ is used to correct i2corr for the interfering effects of hematocrit.

In one embodiment, the following equation is then used to determine the glucose concentration:

$$G_{basic} = \left(\left|\frac{i_r}{i_l}\right|\right)^p \cdot (a \cdot |i_{2corr}| - z_{gr}),$$

where:
$G_{basic}$ is the analyte concentration;
$i_r$ is the sum of the third current values during the third time interval;
$i_l$ is the sum of the second current values during the second time interval;

$$i_{2corr} = \frac{|i_{pc}| + b|i_{ss}| - 2|i_{pb}|}{|i_{pc}| + b|i_{ss}|} \cdot i_r;$$

and a, b, p and $z_{gr}$ are predetermined coefficients.
In one specific example, $$i_{2corr} = \frac{|i(4.1\ s)| + b|i(5\ s)| - 2|i(1.1\ s)|}{|i(4.1\ s)| + b|i(5\ s)|} \cdot i_r.$$

In another example, different test strip chemistries may be used, in which the times that appear in the current evaluation are changed in accordance with the above generic relation. Additional details relating to the applied waveform and the determination of analyte concentration of a test strip are provided in U.S. Pat. No. 8,709,232 B2 and International Patent Publication No. WO 2012/012341 A1, previously incorporated by reference herein.

Figure 6A:
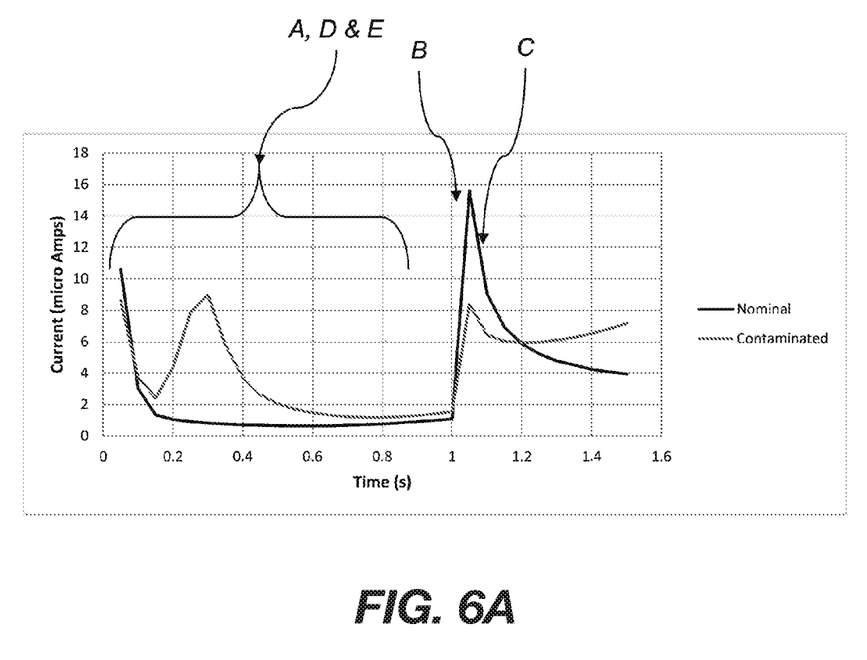
FIG. 6A depicts a graphical comparison illustrating measured current values between a nominal test strip and contaminated test strip over time based upon a portion of the waveform of FIG. 5A.

As noted, FIG. 6A details an enlarged partial view of the relationship between current versus time based on the waveform of FIG. 5A. In this figure, the current response of FIG. 5B is reproduced for a nominal (uncontaminated) test strip, such as test strip 62, FIG. 1, as compared to a current response of moisture contaminated test strips. As clearly demonstrated in this figure, there are a number of characteristic anomalies between nominal and aberrant/defective test strips over portions of the current transient. More specifically, contaminated test strips include a plurality of spiked current transients exhibited between approximately 0 and 1 second (during the predetermined first time interval). In addition, contaminated test strips demonstrate a reduced peak value $i_p b$ after application of the test voltage at the initiation of the second time interval at about 1 second after initiation of the test sequence.

Without being limited to any particular theory, the physical mechanism of moisture contamination appears to be that the introduction of moisture (from storage conditions or other cause) causes conversion of potassium ferricyanide in the reagent layer of the test strip to potassium ferrocyanide. In such a case, the reagent layer has a higher concentration of potassium ferrocyanide, which may diffuse and be consumed at both the first and second electrode surfaces during an analyte concentration measurement. Thus, the analyte signal will be amplified, leading to a higher than expected glucose measurement when the test strip is contaminated.

As verified by experimentation, described in a later portion, there are a number of discrete and identifiable anomalies in the first and second time intervals of the test waveform that are attributable to contamination (moisture) effects. These effects are comparatively illustrated in FIG. 6A. This contamination may be characterized both by physical changes and chemical changes to the test strip. For instance, physical changes occur because the test strip, which before contamination or damage included an electrode coated with a uniform layer of mediator, may now effectively appear as a rough or inconsistent layer of unconverted mediator. In such a case, when a blood sample is applied to the test strip, transient currents such as those observed in the first time interval may be created due to the inconsistency of this layer of the test strip.

In addition, the test strip may also experience chemical changes. These chemical changes may be due to the overall amount of mediator that has been converted leading to tangible and perceivable changes in the expected current response of the test strip upon an applied voltage and more specifically the second test voltage. The combination of both physical and chemical changes to contaminated or damaged test strips has been described in general terms, but the technique for determining contamination is not limited by any particular aspects of this discussion.

As a result of the perceivable differences between expected current response of a nominal test strip and that exhibited by contaminated test strips, a number of reference values labeled for convenience as A-E according to FIG. 6A, may be adduced when a test strip is inserted into a portable test meter for purposes of analyte measurement. According to one embodiment, it has been determined that identification of specific aspects of the aberrant current response (depicted as reference values A, B and C) may be sufficient to determine the presence of a contaminated test strip.

According to one embodiment, reference value A is the total summed value of measured current values during the first time interval, e.g., between 0.20 and 0.75 seconds. As noted above, contaminated test strips exhibit physical changes leading to a greater current response in the first time interval due to the mediator layer becoming physically less consistent. Thus, the summation of current values during the first time interval is indicative of the magnitude of these physical changes to the test strip due to the contamination, and serves as reference value A. In one specific example, contaminated test strips exhibit a sum of current values between 0.20 and 0.75 seconds in an amount greater than 6.5 µA.

As noted above, contaminated test strips exhibit a smaller peak current $i_{bc}$ at 1.0 seconds, due to chemical changes in the test strip caused by contamination. Such contamination leads to a deviation in the peak current. In one specific example, if the measured peak current value $i_{pb}$ during the second time interval is less than 12.5 µA, the chemical changes consistent with contamination is indicated, and this peak value represents reference value B.

Figure 6B:
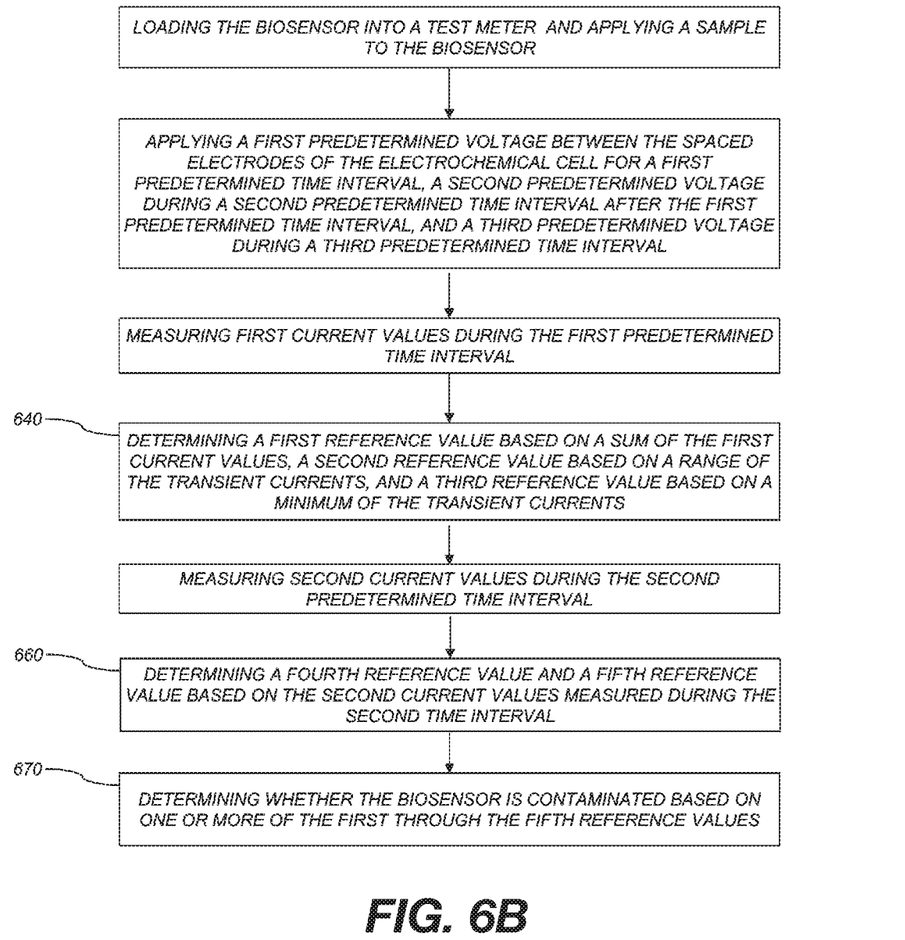
FIG. 6B is a flowchart representing a method for determining the presence of contamination in a test strip in accordance with aspects set forth herein.

Further, the chemical changes also lead to a slower negative rate of change in measured current following the peak current. As such, if the peak is at 1.05 seconds, the difference in value between 1.10 seconds and 1.05 seconds is a measure of this rate of change, which herein is referred to as reference value C. Thus, a strip may be further characterized with reference value C being the difference between the current value at 1.10 seconds and the current value at 1.05 seconds. In one specific example, this difference may be between 0 and −3.5 µA. In another example, this difference may be divided by the time difference of the two values (e.g., 1.10 seconds-1.05 seconds=0.05 seconds), to give the time rate of change of the current. With reference to FIG. 6B, reference values B and C can be determined at step 660.

In one embodiment, the reference values B and C may be used in conjunction with the reference values A, in order to determine contamination of the test strip, e.g., at step 670 of FIG. 6B. Upon determining that the test strip is contaminated, at step 670 of FIG. 6, the meter may display or annunciate a message indicating contamination of the test strip. Advantageously, determination of contamination of test strips allows for education of the user of the test meter. Information may be provided to the user that educates the user on the proper storage of the test strips, including the need for storing the test strips in the provided sealed container and away from extreme heat or light.

In one embodiment, upon the determination of contamination of a particular test strip using Flags noted above, the test measurement system can invalidate the test result from the contaminated biosensor and a new biosensor should be loaded for testing. And, if the new biosensor does not exhibit the waveform characteristics associated with contamination, the test measurement system can annunciate the result of the testing to the patient. In other embodiments, an automated delivery of insulin may be made to the patient only if the biosensor was not contaminated as determined by the technique noted above.

In another embodiment, a further refinement makes use of the observation that contaminated test strips are characterized as having a greater range of current values during the first interval than nominal test strips. Specifically, a range is defined as the difference between the largest current value and the smallest current value of the transient currents that are exhibited in the contaminated test strips, in the first time interval. Thus, a reference value D is defined as the difference between the largest current value and the smallest current value during the first time interval. In one specific example, for contaminated test strips, this range of difference, i.e., reference value D, is greater than 0.57 µA, and for nominal test strips this range is less than 0.57 µA.

In an additional embodiment, another refinement eliminates false positive contamination determinations by checking whether the contaminated test strips exhibit currents that are consistent with test strip movement within the meter during testing. For example, movement of the finger against the test strip during testing can cause some current deviations during the testing process. Thus, a reference value E may be defined that is the minimum of the currents in the first time interval is greater than 0 µA. With reference to FIG. 6B, reference values A, D and E can be determined at step 640.

Given the definitions of the reference values A-E, a set of flags ($Flag_A$-$Flag_E$) may be defined for purposes of an analyte measurement system as based on the perceivable and representative differences between nominal test strips (FIGS. 5B and 6A) and aberrant test strips (FIG. 6A). Each of the flags is a Boolean flag that may be either true or false, and each flag A-E is based on comparing respective reference value A-E to a respective range or value that is defined by a respective target value A-E.

$Flag_A$ is TRUE if reference value A, defined as the total summed value in a portion of the first time interval, e.g., between 0.20 and 0.75 seconds, is greater than a target value A. The target value A in this specific example is 6.5 µA. However, it has been determined that a target value A in the range of 5-10 µA provides adequate efficacy.

$Flag_B$ is TRUE if reference value B, defined as the measured peak current value $i_p$b during the second time interval is less than about a target value B. The target value B in this specific example is 12.5 µA. However, it has been determined that a target value B in the range of 12-12.5 µA provides adequate efficacy for the purposes of identifying an aberrant test strip.

$Flag_C$ is TRUE if reference value C, defined as the difference in current value between the measured peak current value $i_p$b (e.g., at 1.05 seconds) and the current value at 1.10 seconds is between 0 and a target value C. The target value C is −3.5 µA in this specific example. However, it has been determined that a target value C in the range of about 0--4.5 µA provides adequate efficacy for purposes of identifying a contaminated test strip.

$Flag_D$ is TRUE if reference value D, defined as the difference between the largest current value and the smallest current value in the first time interval is greater than about a target value D. It has been determined that a target value D in the range of about 0.4-0.65 µA provides adequate efficacy. According to this specific example, the target value D is 0.57 µA.

Finally, $Flag_E$ is TRUE if reference value E, defined as the minimum transient current in the first time interval is greater than about a target value E, such as for example about 0 μA as in this specific example.

In one embodiment, the determination of contamination or damage of the test strips may be made when one or more of $Flag_A$-$Flag_E$ evaluate as true, for example only $Flag_A$, $Flag_B$ and $Flag_C$. In another embodiment, determination of contamination or damage of test strips may be made when all of $Flag_A$-$Flag_E$ evaluate as true. For example, Flags A, D and E may be viewed as representing the physical changes due to contamination noted above, and Flags B and C may be viewed as representing the chemical changes due to the contamination noted above. In such a case, the combination of at least one flag from each group, i.e., one of Flags A, D and E and one of Flags B and C, may be used to determine contamination through a combination of physical changes and chemical changes to the test strip.

Of further note, Flags A, D and E occur earlier in the test sequence than Flags B and C, and thus may be more susceptible to false positives due to blood fill issues from a finger, or movement/nudging of the test strip during the test. As an advantage, the present technique may combine flags from each group in order to eliminate such false positives, so that uncontaminated test strips are not wasted due to these false positives. In addition, the selection of target values A-E in the ranges noted above advantageously provide a balance between the desired outcome of catching as many true positives as possible while avoiding as many false positives as possible.

Unexpectedly, during testing of test strips which were deliberately exposed to moisture, a variety of deviations occur in the output waveform, including the transient current values, which are described above with respect to FIG. 6A. While there is some potential variation that can be experienced based on application of sample from a fingertip as opposed to a pipette due to variabilities in fill rate, for example, there may also be observed a demonstrated change in current response from the nominal current response of FIG. 5B due to physical characteristic changes in the reagent layer, as described above.

To verify confidence in the above-described technique, tests were conducted on 92 contaminated test strips. The test strips were determined to be contaminated because the test strips were stored in containers that included a dessicant, and the dessicant was examined and found to include moisture. A test meter was used to apply voltages to the test strips and captured the output currents as described herein. First, traditional techniques for detecting test errors were applied to the captured currents, and a total of 39 of the contaminated test strips were identified as having errors related to other factors, such as filling, etc. When the present technique was applied to the captured transients, using a combination of Flags A, B, C, D and E, all 92 contaminated test strips were properly identified based on the above described reference values.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method for determining the presence of contamination of a biosensor, the method comprising:
   loading the biosensor into a test meter and applying a sample having an analyte of interest to the biosensor, the biosensor having an electrochemical cell defined by a pair of spaced electrodes;
   applying a first predetermined voltage between the spaced electrodes of the electrochemical cell for a first predetermined time interval, and a second predetermined voltage between the spaced electrodes during a second predetermined time interval after the first predetermined time interval;
   measuring first current values during the first predetermined time interval at a frequency of about 1 measurement per millisecond to 1 measurement per 100 milliseconds;
   determining a first reference value that is a sum of the first current values measured during the first predetermined time interval;
   measuring second current values during the second predetermined time interval;
   determining a second reference value based on a peak current value measured during the second predetermined time interval and a third reference value based on the rate of change in current values measured after the peak current value during the second time interval;
   determining whether the biosensor is contaminated based on one or more of the first through the third reference values; and
   suppressing reporting of the concentration of the analyte in the sample upon the determination that the biosensor is contaminated based on the one or more of the first through the third reference values, and
   wherein the concentration of the analyte in the sample is calculated based upon the sum of second current values measured in the second time interval and the sum of third current values measured in a third predetermined time interval.

2. The method of claim 1, wherein determining the biosensor is contaminated is based on all of the first through the third reference values.

3. The method of claim 1, wherein the first reference value comprises a sum of the first current values between about 0.2 seconds and 0.75 seconds after applying the first predetermined voltage, and the determining the biosensor is contaminated is based on the first reference value being greater than about 6.5 µA.

4. The method of claim 1, wherein the second reference value is based on the peak current value measured during the second predetermined time interval being less than about 12.5 µA.

5. The method of claim 4, wherein the peak current value is measured at about 0.05 seconds after applying the second predetermined voltage.

6. The method of claim 1, wherein the third reference value comprises a difference between a measured current value at about 0.1 seconds after applying the second predetermined voltage and the peak current value measured during the second predetermined time interval, and the determining the biosensor is contaminated is based on the third reference value being between about −3.5 µA and 0 µA.

7. The method of claim 1, further comprising determining a fourth reference value based on a magnitude of the difference between a highest measured current value and a lowest measured current value during the first predetermined time interval, and determining the biosensor is contaminated is further based on the fourth reference value.

8. The method of claim 7, wherein the fourth reference value comprises the magnitude of the difference between the highest measured current value and the lowest measured current value between about 0.2 seconds and 0.75 seconds after applying the first predetermined voltage, and determining the biosensor is contaminated is based on the measured second reference value being greater than about 0.57 µA.

9. The method of claim 1, further comprising determining a fifth reference value based on a minimum measured current value during the first predetermined time interval, and determining the biosensor is contaminated is further based on the fifth reference value.

10. The method of claim 9, wherein the fifth reference value comprises a minimum of the current values between about 0.2 seconds and 0.75 seconds after applying the first predetermined voltage, and determining the biosensor is contaminated is based on the fifth reference value being greater than about 0 µA.

11. The method of claim 1, wherein calculating the analyte concentration comprises using an equation of the form $$G_{basic} = \left(\left|\frac{i_r}{i_l}\right|\right)^p \cdot (a \cdot |i_{2corr}| - z_{gr}),$$

in which:
   $G_{basic}$ is the analyte concentration;
   $i_r$ is the sum of the third current values during the third time interval;
   $i_l$ is the sum of the second current values during the second time interval;

$$i_{2corr} = \frac{|i_{pc}| + b|i_{ss}| - 2|i_{pb}|}{|i_{pc}| + b|i_{ss}|} \cdot i_r;$$

and
   a, b, p and $z_{gr}$ are predetermined coefficients.

* * * * *